(12) United States Patent
Then

(10) Patent No.: US 11,234,125 B2
(45) Date of Patent: Jan. 25, 2022

(54) TWO-FACTOR AUTHENTICATION FOR WIRELESS FIELD DEVICES

(71) Applicant: Rosemount Inc., Shakopee, MN (US)

(72) Inventor: Matthew M. Then, Minneapolis, MN (US)

(73) Assignee: Rosemount Inc., Shakopee, MN (US)

( * ) Notice: Subject to any disclaimer, the term of this patent is extended or adjusted under 35 U.S.C. 154(b) by 214 days.

(21) Appl. No.: 16/536,489

(22) Filed: Aug. 9, 2019

(65) Prior Publication Data

US 2021/0044973 A1 Feb. 11, 2021

(51) Int. Cl.
| | |
|---|---|
| *G06F 21/00* | (2013.01) |
| *H04W 12/06* | (2021.01) |
| *H04L 29/06* | (2006.01) |
| *H04W 12/041* | (2021.01) |
| *H04W 12/0431* | (2021.01) |

(52) U.S. Cl.
CPC ........... *H04W 12/06* (2013.01); *H04L 63/068* (2013.01); *H04L 63/083* (2013.01); *H04W 12/041* (2021.01); *H04W 12/0431* (2021.01); *H04L 2463/082* (2013.01)

(58) Field of Classification Search
CPC ............... H04W 12/06; H04W 12/041; H04W 12/0431; H04W 12/50; H04L 63/083; H04L 63/068; H04L 2463/082; H04L 63/0838; H04L 63/0846
See application file for complete search history.

(56) References Cited

U.S. PATENT DOCUMENTS

| | | | | |
|---|---|---|---|---|
| 10,271,207 | B2 | 4/2019 | Haase | |
| 10,469,487 | B1 * | 11/2019 | Griffin | ................. H04L 9/3242 |
| 10,489,781 | B1 * | 11/2019 | Osborn | ................. H04L 9/0866 |
| 10,505,738 | B1 * | 12/2019 | Rule | ......................... H04L 9/14 |
| 2011/0088087 | A1 * | 4/2011 | Kalbratt | ................. G06Q 20/02 |
| | | | | 726/7 |
| 2018/0026954 | A1 * | 1/2018 | Toepke | ................. H04L 63/083 |
| | | | | 726/4 |
| 2018/0288039 | A1 | 10/2018 | Haase et al. | |

OTHER PUBLICATIONS

International Search Report and Written Opinion for International Patetn Applciation No. PCT/US2020/044173, dated Oct. 30, 2020, 9 pages.

\* cited by examiner

*Primary Examiner* — Kendall Dolly
(74) *Attorney, Agent, or Firm* — Christopher R. Christenson; Kelly, Holt & Christenson, PLLC

(57) ABSTRACT

A method for authenticating a user of a handheld field maintenance tool is provided. The method includes moving the handheld field maintenance tool into a proximity of a field device. The field device receives a primary key. The field device generates a secondary key and transmits the secondary key to a remote system. The remote system transmits the secondary key to the user of the handheld field maintenance tool. The field device receives the secondary key. The field device authenticates the user of the handheld field maintenance tool.

21 Claims, 6 Drawing Sheets

TWO-FACTOR AUTHENTICATION FOR WIRELESS FIELD DEVICES

BACKGROUND

In a field device that allows wireless communication with handheld field maintenance tools, security is paramount. Traditional security methods require a key of sorts, such as a pin or password, that must be entered before access to a field device is granted. This can be an effective method to protect a field device from unauthorized access because without that key, access to the field device is not possible. However, if that key ends up in the possession of a user who is not authorized to access the field device, he or she can now access the system and the security is compromised.

SUMMARY

A method for authenticating a user of a handheld field maintenance tool is provided. The method includes moving the handheld field maintenance tool into a proximity of a field device. The field device receives a primary key. The field device generates a secondary key and transmits the secondary key to a remote system. The remote system transmits the secondary key to the user of the handheld field maintenance tool. The field device receives the secondary key. The field device authenticates the user of the handheld field maintenance tool.

DETAILED DESCRIPTION OF ILLUSTRATIVE EMBODIMENTS

Figure 1:
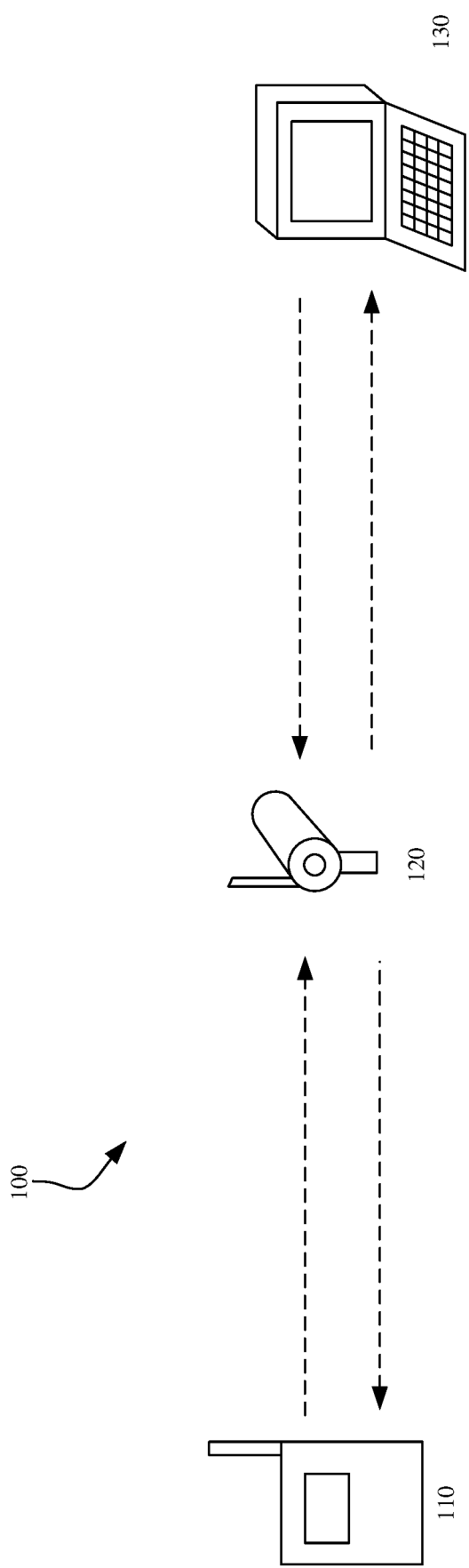
FIG. 1 is a diagrammatic view of a handheld field maintenance tool authentication environment with which embodiments of the present invention are particularly useful.

FIG. 1 is a diagrammatic view of a handheld field maintenance tool authentication environment with which embodiments of the present invention are particularly useful. Handheld field maintenance tool authentication environment 100 comprises a handheld field maintenance tool 110 communicatively coupled, either directly or indirectly, via wireless communication modules (not shown) to a field device 120 and field device 120 communicatively coupled, either directly or indirectly, to a remote system 130. Field device 120 is generally illustrated as a wireless process variable transmitter, such as those sold under the trade designation Model 3051 S Wireless Process Transmitter, from Emerson Automation Solutions, of Chanhassen, Minn. However, those skilled in the art will recognize that field device 120 can include other types of wireless field devices, as well as wireless actuators, or valve positioners. Additionally, those skilled in the art will appreciate that at least some methods and systems herein can apply to wired field devices as well. Further, embodiments of the present invention are also applicable to wired field devices that have wireless technology (such as Bluetooth communication) built into them.

Handheld field maintenance tool 110 is configured to communicate with field device 120 using known wireless process communication protocols. One wireless process communication technology standard is known as the WirelessHART standard, published by the Highway Addressable Remote Transducer (HART®) Communication Foundation in September 2007. Another wireless network communication technology is set forth in ISA 100.11A, maintained by the International Society of Automation (ISA) which proposed wireless communication at the 2.4 GHz frequency using radio circuitry in accordance with IEEE 802.15.4-2006. However, any suitable wireless process communication protocol can be used. Additionally, as will be described in greater detail below, handheld mobile devices, such as handheld field maintenance tool 110 often communicate using the Bluetooth protocol.

In order for handheld field maintenance tool 110 to connect to field device 120, it is necessary for tool 110 to be authenticated. Authenticating a handheld field maintenance tool, using the two-factor authentication methods described herein, prevents unauthorized tools from connecting and accessing field devices. Additionally, the authentication methods prevent unauthorized users of handheld field maintenance tools from accessing field devices via utilizing a trusted network.

Figure 2:
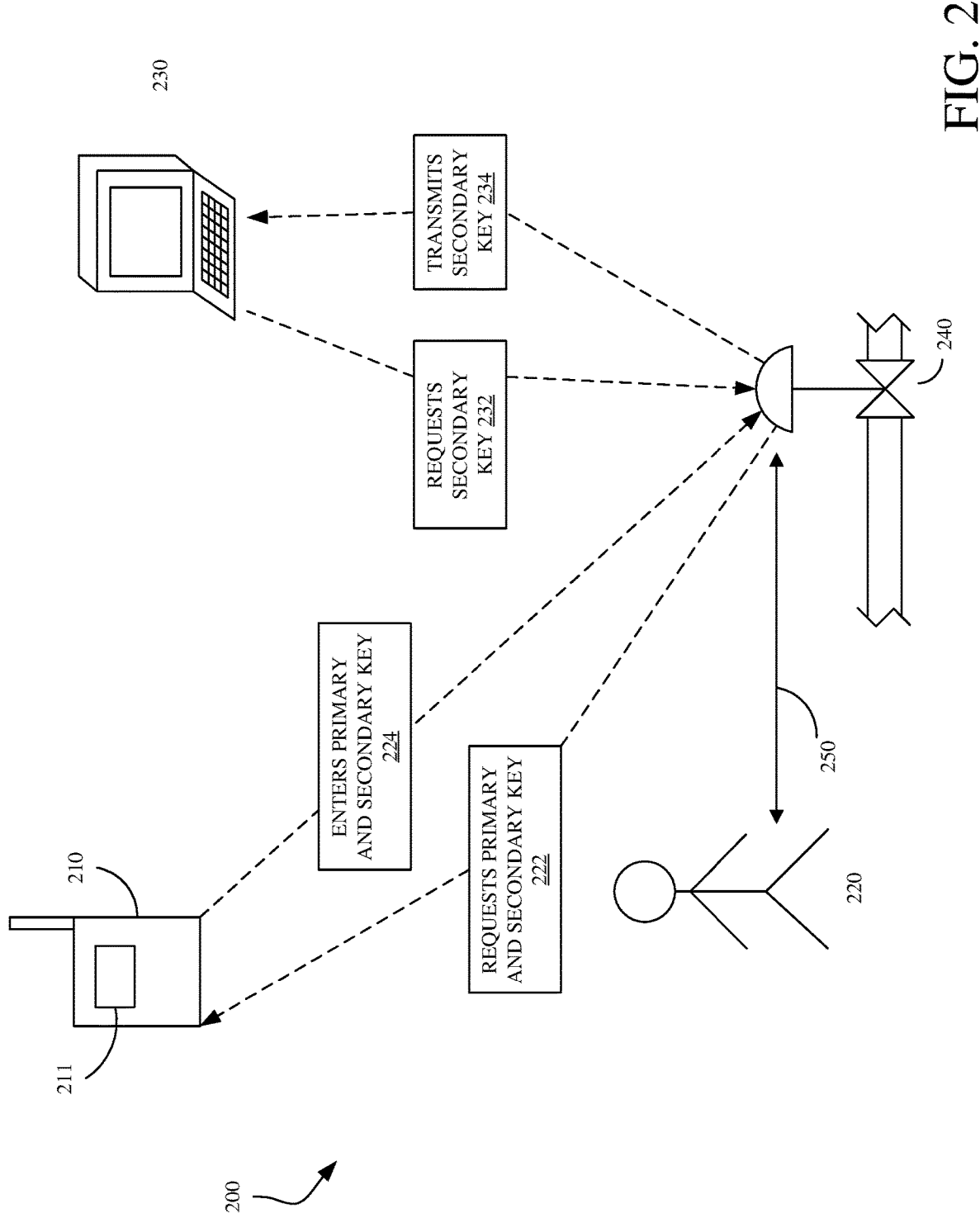
FIG. 2 is a block diagram of an example handheld field maintenance tool authentication environment in accordance with an embodiment of the present invention.

FIG. 2 is a block diagram of a handheld field maintenance tool authentication environment in accordance with an embodiment of the present invention. Handheld field maintenance tool authentication environment 200 illustratively includes a handheld field maintenance tool 210 in communication with a field device 240, and a remote system 230 in communication with field device 240.

Handheld field maintenance tool 210 is illustratively operated by a user 220. User 220 may use handheld field maintenance tool 210 within a communicative range 250 of one or more field devices 240. As shown in FIG. 2, when user 220 is within communicative range 250 of field device 240, field device 240 may request a primary and secondary key 222 from user 220 of handheld field maintenance tool 210. A display 211 on handheld field maintenance tool 210 may provide user interface elements which allow user 220 to enter his or her primary and secondary key 224.

Field device 240 is illustratively communicatively coupled to a remote system 230. As shown in FIG. 2, remote system 230 requests a secondary key 232 from field device 240 and field device 240 transmits secondary key 234 to remote system 230. In one example, remote system 230 may request a secondary key generated by field device 240 prior to handheld field maintenance tool 210 communicatively coupling with field device 240. In another example, remote system 230 may request a secondary key generated by field device 240 only after handheld field maintenance tool 210 has communicatively coupled with field device 240 and a primary key has been successfully entered. Once remote system 230 has obtained the secondary key from field device 240, remote system 230 may transmit the secondary key to user 220 via a trusted network. The trusted network may include transmitting the secondary key to user 220 through encrypted or unencrypted electronic mail, encrypted or unencrypted text messages, telephonic calls, or handheld transceiver. In one example, an operator of remote system 230 may transmit the secondary key to user 220. In another example, user 220 may have access to remote system 230 and receive the secondary key for him or herself.

Figure 3:
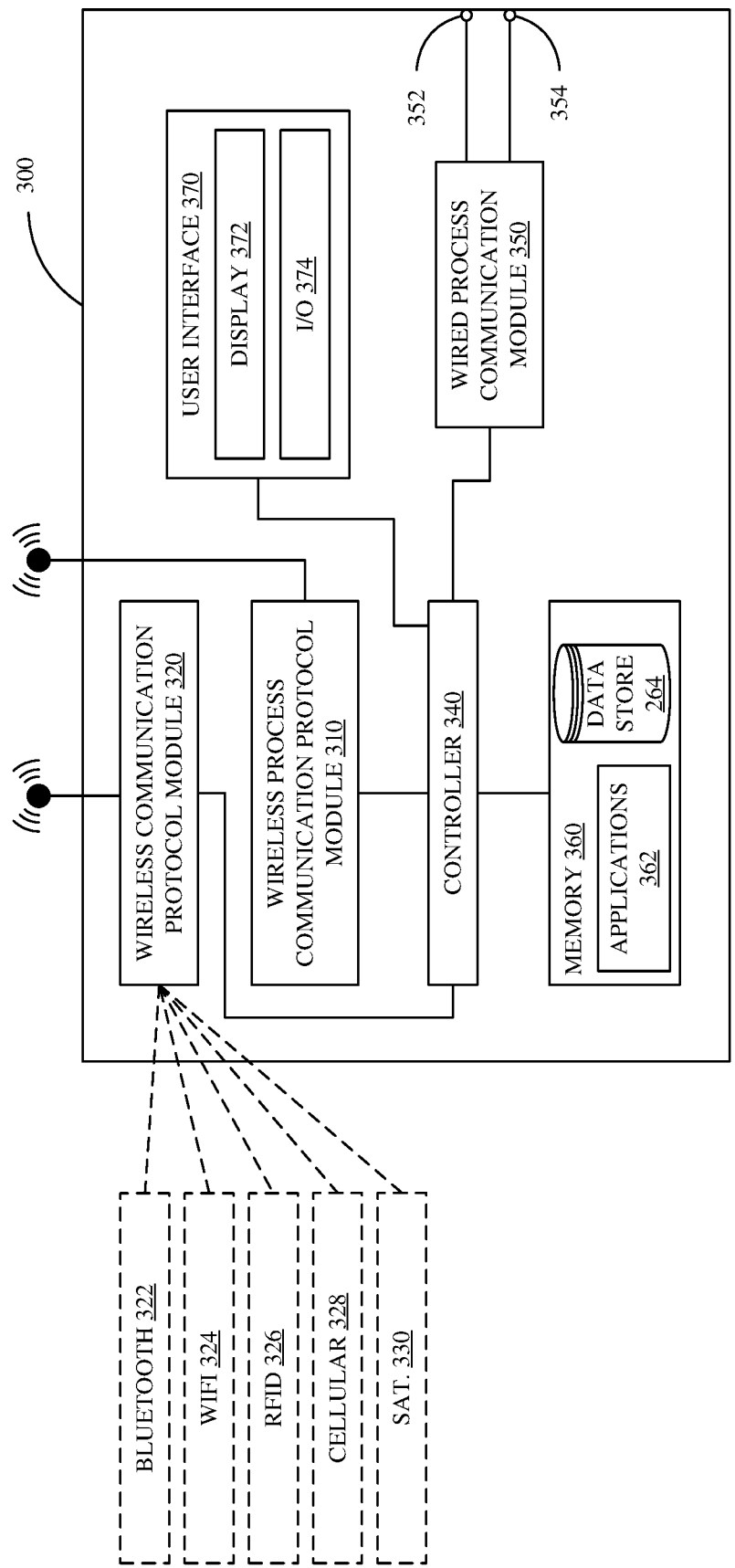
FIG. 3 is a block diagram of a handheld field maintenance tool in accordance with an embodiment of the present invention.

FIG. 3 is a block diagram of a handheld field maintenance tool in accordance with an embodiment of the present invention. Handheld field maintenance tool 300 is generally illustrated as a mobile device, such as those sold under the trade designation AMS Trex Device Communicator, from Emerson Automation Solutions, of Chanhassen, Minn. However, other suitable mobile devices such as a personal digital assistant, laptop computer, tablet, or smartphone could also be used.

Handheld field maintenance tool 300 includes at least one wireless process communication protocol module 310. Suitable examples for wireless process communication protocol module 310 include any module that generates and/or receives proper signals in accordance with a known process communication protocol, such as the Wireless HART protocol, Fieldbus protocol, HART protocol, or that set forth in ISA 100.11A, described above, or another suitable communication protocol. While FIG. 3 shows a single wireless process communication protocol module 310, it is expressly contemplated that any suitable number of wireless process communication protocol modules can be used to communicate in accordance with various wireless process communication protocols now in existence or later developed.

Handheld field maintenance tool 300 may also include at least one secondary wireless communication protocol module 320. Wireless communication protocol module 320 can communicate in accordance with one or more of the options shown in phantom in FIG. 3. Specifically, wireless communication protocol module 320 may communicate in accordance with a Bluetooth® specification 322, a WiFi specification 324, a Radio-Frequency Identification (RFID) specification 326, cellular communication techniques 328, satellite communication 330, or any other suitable wireless data communication technology, such as LTE. While one wireless communication protocol module 320 is shown in FIG. 3, any suitable number may be used.

In one embodiment, each of the wireless process communication protocol module 310 and wireless communication protocol module 320 is coupled to controller 340 which is also coupled to the wired process communication module 350. Controller 340 is preferably a microprocessor that executes a sequence of instructions to perform a number of handheld field maintenance tasks. Wired process communication module 350 allows handheld field maintenance tool 300 to be physically coupled via a wired connection, at terminals 352, 354 to a field device, for example. Examples of suitable wired process communication include the HART protocol, the FOUNDATION™ Fieldbus protocol, and others. Handheld field maintenance tool 300 may also include a memory component 360 configured to store one or more applications 362 as well as a data store 364.

Memory 360 may contain instructions, that, when executed, cause handheld field maintenance tool 300 to run one or more of applications 362. For example, a user may wish to connect to a field device by authenticating handheld field maintenance tool 300. The user may indicate, for example through an input/output mechanism 374, which may be part of a user interface 370 of handheld field maintenance tool 300, that he or she wishes to run one of the applications 362. In response to the received indication, handheld field maintenance tool 300 may run the stored instructions, causing the field device to respond and an initial connection between the field device and handheld field maintenance tool 300 to be formed for authentication purposes. In one example, handheld field maintenance tool 300 may be configured to store the results of the authentication attempt, for example within data store 364. In another example, handheld field maintenance tool 300 may be configured to send a report of the results of the authentication attempts to a remote system, for example a remote control room, or other remote system.

A user may indicate which field device he or she would like to connect with using an appropriate button or via navigation of handheld field maintenance tool 300 presented on a display 372 of handheld field maintenance tool 300. Once the device authentication function has been selected, controller 340 may cause display 372 to provide one or more user interface elements that assist the user in authenticating handheld field maintenance tool 300 to a selected field device. For example, user interface 370 may include a dropdown box that lists all known field devices within a proximity of handheld field maintenance tool 300. In another example, user interface 370 may include a dropdown box that lists all known field devices communicatively coupled to a remote system. The user may then select which field device he or she wishes to connect with by selecting the appropriate button.

Figure 4:
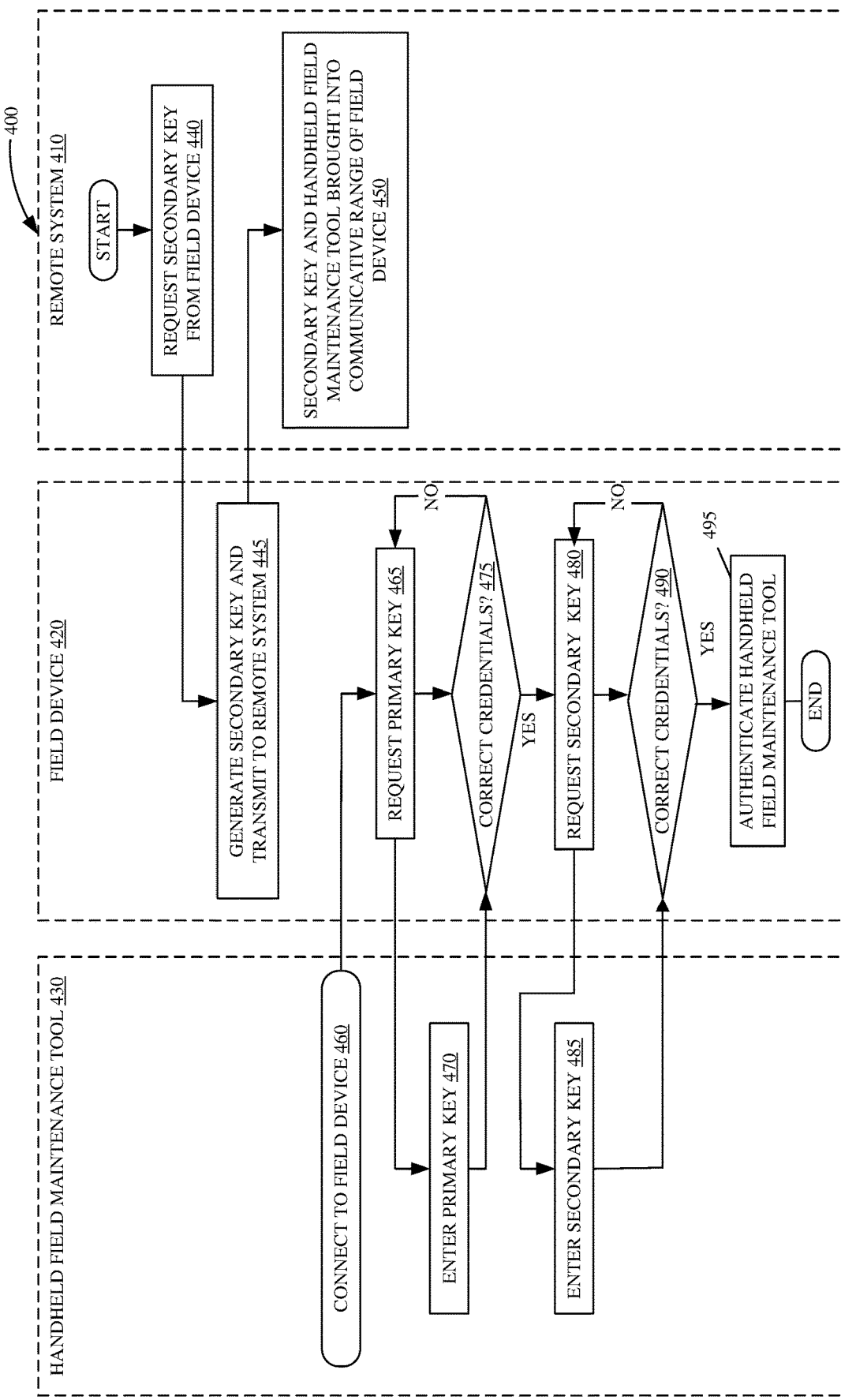
FIG. 4 is a flow diagram of a method of authenticating a handheld field maintenance tool in accordance with an embodiment of the present invention.

FIG. 4 is a flow diagram of a method of authenticating a handheld field maintenance tool in accordance with one embodiment of the present invention. Method 400 may be used to authorize handheld field maintenance tool 430 to access field device 420 and establish a wireless connection between handheld field maintenance tool 430 and field device 420. This may be useful, for example, in preventing security breaches by unauthorized handheld field maintenance tools and/or users.

At block 440, remote system 410 requests a secondary key from field device 420. In one example, remote system 410 requests a secondary key from field device 420 whereby field device 420 was selected by the user of handheld field maintenance tool 430. In another example, remote system 410 may generate an automatic request to field device 420 for a secondary key upon receiving a signal from field device 420 that a connection with handheld field maintenance tool 430 is desired.

At block 445, field device 420 generates a secondary key and transmits said key back to remote system 410. In one example, the secondary key is a one-time key meaning after a successful entry of said key, and handheld field maintenance tool 430 is connected to field device 420, said key will not be valid for subsequent authorization attempts. Instead, a new secondary key would be generated by field device 420. In another example, the secondary key would have an expiration time associated with it, meaning after a certain time has elapsed and a successful authorization did not occur, the secondary key would no longer be valid, and a new secondary key would need to be generated by field device 420. It is noted that the secondary key may comprise any length of numbers, letters, or characters in combination or alone generated by field device 420.

At block 450, remote system 410 receives the secondary key generated from field device 420 and the user of handheld field maintenance tool 430 who requested the secondary key brings handheld field maintenance tool 430 along with the secondary key into a proximity of field device 420. In one example, this may comprise bringing handheld field maintenance tool 430 within a communicative range of field device 420.

In one example, bringing handheld field maintenance tool 430 into communicative range of field device 420 comprises handheld field maintenance tool 430 presenting, on a display component, a prompt indicating that the user may be in communicative range and requesting confirmation. The prompt may include an indication of what the field device looks like, or where the device is located, as many field devices may not be located at eye level. It is also expressly contemplated that a user could initiate a connection through the handheld device by selecting a field device out of a list of available field devices within communicative range.

At block 460, handheld field maintenance tool 430 initiates a connection with field device 420. In one example, initiating a connection comprises handheld field maintenance tool 430 presenting, on a display component, a prompt indicating that the user may be in communicative range of the field device and requesting confirmation. And the user confirming said request. In another example, initiating a connection comprises handheld field maintenance tool 430 automatically connecting with field device 420 upon the user being within a communicative range of field device 420.

At block 465, field device 420 requests a primary key from handheld field maintenance tool 430. In one example, handheld field maintenance tool 430 may present, on a display component, a prompt indicating that the user may enter, using an interface element, his or her primary key. The primary key may comprise a password or pin of any length of numbers, letters, or characters in combination or alone. In one example, the primary key is specific to the user of handheld field maintenance tool 430. In another example, the primary key may be specific to handheld field maintenance tool 430. In yet another example, the primary key may be specific to field device 420.

At block 470, the user of handheld field maintenance tool 430 enters the primary key, using an interface element. At block 475, field device 420 receives the primary key and identifies whether the key is acceptable or not. In one example, field device 420 may comprise a memory component with a data store that contains all acceptable primary keys that could be entered by the user of handheld field maintenance tool 430. In another example, field device 420 may transmit the primary key entered to remote system 410 whereby an operator of remote system 410 would receive and verify the primary key entered and transmit to field device 420 verification as to whether the primary key is acceptable or not. In one example, if the primary key is rejected by field device 420, the user may be prompted by handheld field maintenance tool 430, on a display component, to reenter the primary key. In another example, field device 420 may terminate the connection with handheld field maintenance tool 430, thereby prompting the user of tool 430 to reinitiate a connection if desired.

At block 480, field device 420 requests the secondary key from handheld field maintenance tool 430. In one example, handheld field maintenance tool 430 may present, on a display component, a prompt indicating that the user may enter, using an interface element, the secondary key. At block 485, the user of handheld field maintenance tool 430 enters the secondary key generated by field device 420. The user will have received the secondary key via a trusted communication path, such as using the user's mobile telephone, a walkie talkie, or via an encrypted email/text message.

At block 490, field device 420 receives the secondary key and identifies whether the secondary key entered by the user of handheld field maintenance tool 430 matches the secondary key generated by field device 420. In one example, if the secondary key is rejected by field device 420, the user of tool 430 may be prompted by handheld field maintenance tool 430, on a display component, to reenter the secondary key. In another example, field device 420 may terminate the connection with handheld field maintenance field tool 430, thereby prompting the user to reinitiate a connection if desired.

At block 495, handheld maintenance field tool 430 is authenticated with field device 420.

Figure 5:
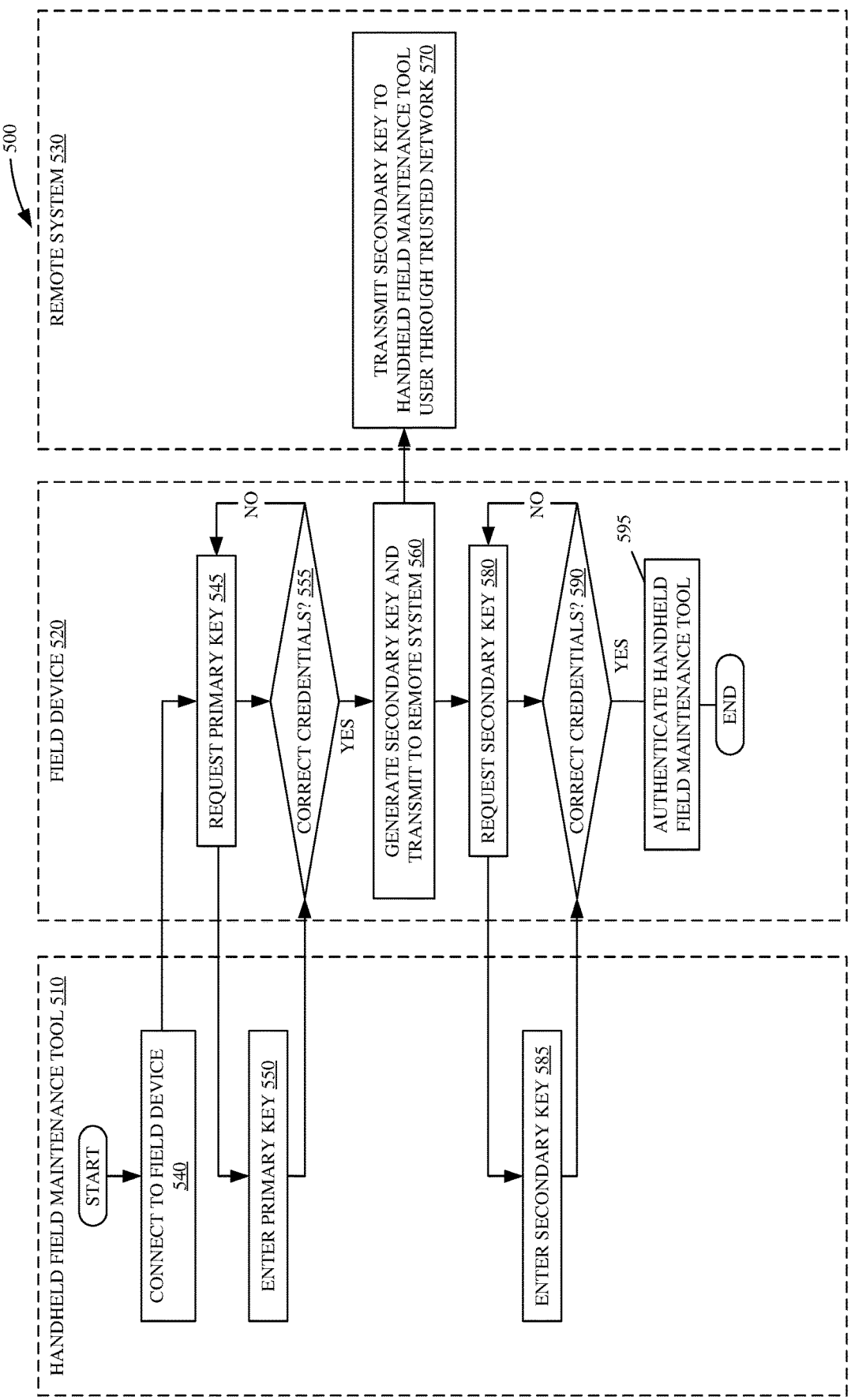
FIG. 5 is a flow diagram of a method of authenticating a handheld field maintenance tool in accordance with an embodiment of the present invention.

FIG. 5 is a flow diagram of a method of authenticating a handheld field maintenance tool in accordance with an embodiment of the present invention. Method 500 may be used to authorize handheld field maintenance tool 510 to access field device 520 and establish a wireless connection between handheld field maintenance tool 510 and field device 520. This may be useful, for example, in preventing security breaches through the use of unauthorized users of handheld field maintenance tools.

At block 540, handheld field maintenance tool 510 initiates a connection with field device 520. A connection may be established when the user of handheld field maintenance tool 510 is within a communicative range of field device 520. In one example, when handheld field maintenance tool 510 is within a proximity of field device 520, handheld field maintenance tool 510 may, on a display component, present a prompt indicating the user may be within communicative range of field device 520 and request confirmation from the user. The prompt may include an indication of what field device 520 looks like, or where field device 520 is located, as many field devices may not be located at eye level. In another example, handheld field maintenance tool 510 may automatically connect with field device 520 upon being within a communicative range of field device 520. It is also expressly contemplated that a user could initiate a connection through the handheld device by selecting a field device out of a list of available field devices within communicative range.

At block 545, field device 520 requests the primary key from the user of handheld field maintenance tool 510. In one example, handheld field maintenance tool 510 may present, on a display component, a prompt indicating that the user may enter, using an interface element, his or her primary key. The primary key may comprise a password or pin of any length of numbers, letters, or characters in combination or alone. In one example, the primary key is specific to the user of handheld field maintenance tool 510. In another example, the primary key may be specific to handheld field maintenance tool 510. In yet another example, the primary key may be specific to field device 420.

At block 550, the user of handheld field maintenance tool 510 enters the primary key, using an interface element. At block 555, field device 520 receives the primary key and identifies whether the key acceptable or not. In one example, if the primary key is rejected by field device 520, the user may be prompted by handheld field maintenance tool 510, on a display component, to reenter the primary key using an interface element. In another example, field device 520 may terminate the connection with handheld field maintenance field tool 510, thereby prompting the user to reinitiate a connection if desired.

At block 560, upon the entry of an acceptable primary key, field device 520 generates a secondary key and transmits said key to a remote system 530. Upon generation of the secondary key, remote system 530 would be notified of a pending connection between handheld field maintenance tool 510 and field device 520. The secondary key may be transmitted to remote system 530 using a known process communication line, for example, HART command. In one example, field device 520 automatically generates and transmits the secondary key to remote system 530 once an acceptable primary key is entered by the user. In another example, handheld field maintenance tool 510 may, on a display component, present a prompt indicating the user has entered an acceptable primary key and request permission from the user to transmit the secondary key to remote system 530.

At block 570, remote system 530 transmits the secondary key to the user of handheld maintenance field tool 510 via a trusted network. The trusted network may comprise of a phone call to the user, handheld transceiver such as a walkie-talkie, or an encrypted or unencrypted email or text message to the user, or any other form of trusted network.

At block 580, field device 520 requests the secondary key from handheld field maintenance tool 510. At block 585, the user of handheld field maintenance tool 510 enters, using an interface element, the secondary key received via the trusted network.

At block 590, field device 520 receives the secondary key and identifies whether the secondary key matches the secondary key generated by field device 520. In one example, if the secondary key is rejected by field device 520, the user may be prompted by handheld field maintenance tool 510 on a display component, to reenter the secondary key using an interface element. In another example, field device 520 may terminate the connection with handheld field maintenance field tool 510, thereby prompting the user to reinitiate a connection if desired.

At block 595, handheld maintenance field tool 510 is authenticated with field device 520.

Figure 6:
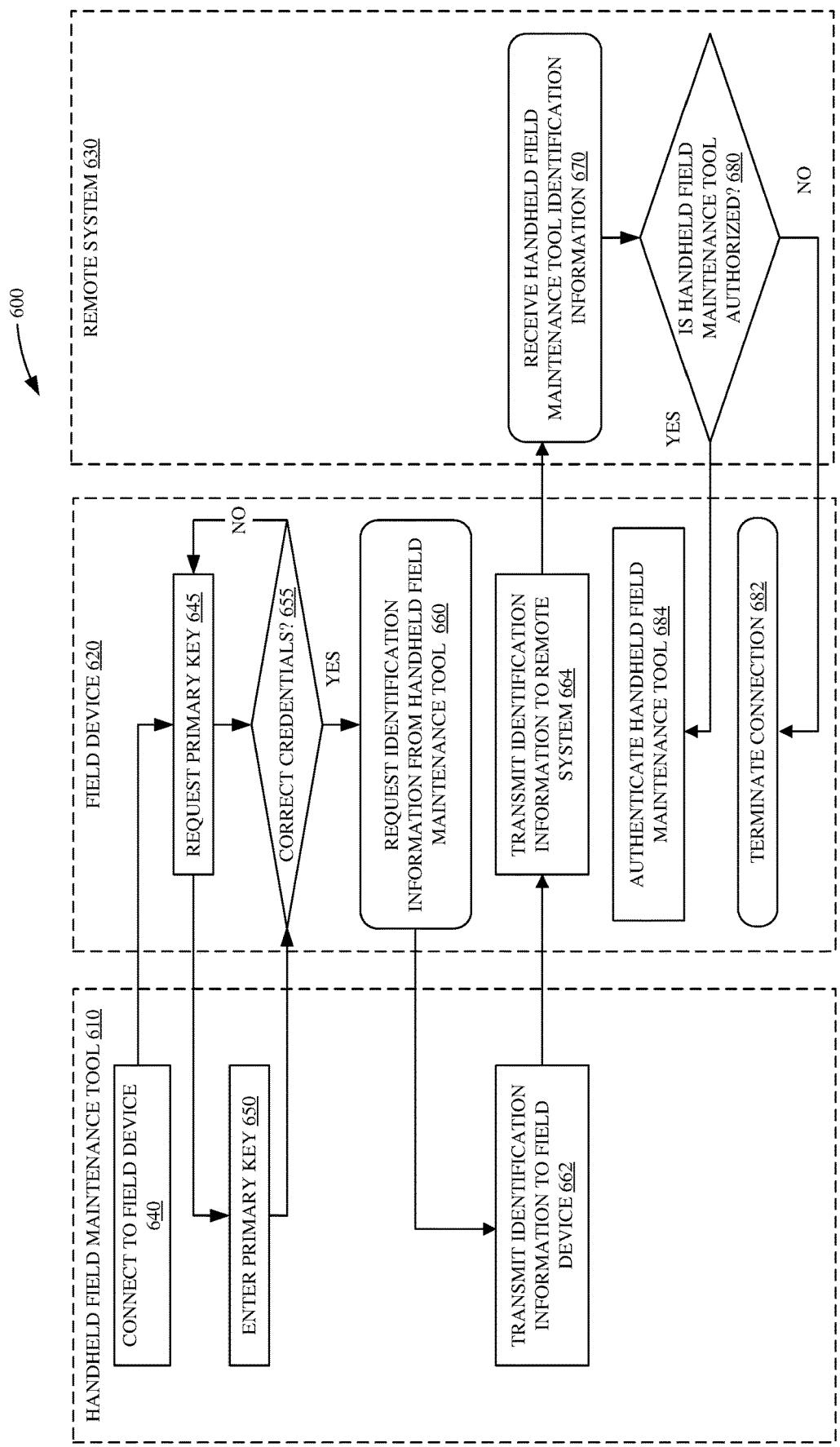
FIG. 6 is a flow diagram of a method of authenticating a handheld field maintenance tool in accordance with an embodiment of the present invention.

FIG. 6 is a flow diagram of a method of authenticating a handheld field maintenance tool in accordance with an embodiment of the present invention. Method 600 may be used to authorize handheld field maintenance tool 610 to access field device 620 and establish a wireless connection between handheld field maintenance field tool 610 and field device 620. This may be useful, for example, preventing security breaches through the use of unauthorized handheld field maintenance tools.

At block 640, handheld field maintenance tool 610 initiates a connection with field device 620. A connection may be established when the user of handheld field maintenance tool 610 is within a communicative range of field device 620. When handheld field maintenance tool 610 is within a proximity of field device 620, handheld field maintenance tool 610 may, on a display component, present a prompt indicating the user may be within a communicative range of field device 620 and request confirmation from the user. The prompt may include an indication of what field device 620 looks like, or where device 620 is located, as many field devices may not be located at eye level. It is also expressly contemplated that a user could initiate a connection through the handheld device by selecting a field device out of a list of available field devices within communicative range.

At block 645, field device 645 requests a primary key from the user of handheld field maintenance tool 610. The primary key may comprise a password or pin may of any length of numbers, letters, or characters in combination or alone. In one example, the primary key is specific to the user of handheld field maintenance tool 610. In another example, the primary key may be specific to handheld field maintenance tool 610. In yet another example, the primary key may be specific to field device 420.

At block 650, the user of handheld field maintenance tool 610 enters the primary key. At block 655, field device 620 receives the primary key and identifies whether it is acceptable or not. In one example, if the primary key is rejected by field device 620, the user may be prompted by handheld field maintenance tool 610 to reenter the primary key. In another example, field device 610 may terminate the connection with handheld field maintenance field tool 610, thereby prompting the user to reinitiate a connection if desired.

At block 660, field device 620 requests identification information from handheld field maintenance tool 610. The handheld field maintenance tool 610 then provides identification information to field device 620 as indicated at reference numeral 662. Field device 620 then transmits the identification information to remote system 630 as indicated at reference numeral 664. The identification information retrieved may comprise some sort of identification information from handheld field maintenance tool 610, for example, what kind of tool it is, security credentials only an approved handheld field maintenance tool would have, and/or unique identification information specific to the handheld field maintenance tool such as its identification number.

At block 670, remote system 630 receives the identification information of handheld field maintenance tool 610. At block 680, remote system 630 establishes whether handheld field maintenance tool 610 is authorized. In one example, remote system 630 automatically authorizes the connection or terminates the connection of handheld field maintenance tool 610 with field device 620 based on the identification information received. In another example, an operator of remote system 630 may determine if handheld field maintenance tool 610 is authorized and the operator either authorizes the connection or terminates the connection of handheld field maintenance tool 610 with field device 620. In this way, the remote system instructs the field device to either allow the connection to continue and authenticate the tool, or terminate the connection and not authenticate the tool.

At block 682, remote system 630 or an operator of remote system 630 terminates the connection between handheld field maintenance tool 610 and field device 620. In one example, handheld field maintenance tool 610 may prompt the user of tool 610 to reinitiate a connection and begin the connection process over if desired. In another example, handheld field maintenance tool 610 may be locked by remote system 630 thereby preventing further actions by the user of handheld field maintenance tool 610. While this embodiment is described with respect to FIG. 6, it is applicable to other embodiments as well, such as those shown in FIGS. 4 and 5.

At block 684, remote system 630 or an operator of remote system 630 authorizes the connection between handheld field maintenance tool 610 and field device 620.

The embodiments described herein serve to enhance the security of a field device by adding another layer, or step, to the security process. If a handheld field maintenance tool wants access to a field device through a wireless connection, not only will it need to enter the key it knows, it will also have to enter a separate secondary key that is produced outside the knowledge of the handheld field maintenance tool, but can be delivered via a trusted network.

Although the present invention has been described with reference to preferred embodiments, workers skilled in the art will recognize that changes may be made in form and detail without departing from the spirit and scope of the invention.

What is claimed is:

1. A method for two-factor authentication of a mobile device to a field device, the method comprising:

initiating a connection between the mobile device and the field device, wherein initiating a connection between the mobile device and the field device includes moving the mobile device into communicative range of the field device;
receiving, by the field device, a primary key;
generating, using the field device, a secondary key;
transmitting, using a trusted communication channel, the secondary key to the user of the mobile device;
receiving, by the field device, the secondary key transmitted to the user of the mobile device; and
authenticating the mobile device based on at least the received first and second keys.

2. The method of claim 1, wherein the trusted communication channel includes a trusted network.

3. The method of claim 2, wherein the trusted network is selected from the group consisting of: a handheld transceiver, electronic mail, a text message, and a telephone call.

4. The method of claim 1, wherein the secondary key is a one-time use key.

5. The method of claim 4, wherein the secondary key will expire after a pre-determined
amount of time.

6. The method of claim 1, wherein the generation of the secondary key by the field device occurs automatically after the primary key is received by the field device.

7. The method of claim 1, wherein the generation of the secondary key by the field device is prompted by a request for the secondary key by a remote system.

8. The method of claim 1, wherein the secondary key is transmitted to a remote system prior to initiating a connection between the mobile device and the field device.

9. The method of claim 1, wherein the secondary key is transmitted after a connection is initiated and a primary key has been entered.

10. The method of claim 1, wherein the mobile device is a handheld field maintenance tool.

11. The method of claim 1, wherein the trusted communication channel includes a remote system.

12. The method of claim 1, wherein initiating a connection between the mobile device and the field device includes initiating a wireless connection between the mobile device and the field device.

13. The method of claim 1, wherein the trusted communication channel includes a process communication network.

14. A handheld field maintenance tool comprising:
a wireless communication protocol module configured to communicatively couple the handheld field maintenance tool to a field device;
a user interface configured to display user authentication instructions, wherein the user authentication instructions are configured to receive a user input;
a controller, coupled to the wireless communication protocol module, the controller being configured to execute the user authentication instructions;
a memory component configured to store the user authentication instructions; and
wherein the controller is configured to:
receive a primary key input;
provide the primary key input to the field device;
receive a secondary key input;
transmit the secondary key to the field device; and
initiate an authenticated communication session based on the primary and secondary keys.

15. The handheld field maintenance tool of claim 14, wherein the controller is configured to display a list of field devices within communicative range and receive user input indicative of a field device with which the user would like to connect.

16. The handheld field maintenance tool of claim 14, wherein the memory contains a data store configured to store authentication attempts of the handheld field maintenance tool.

17. A method of authenticating a mobile device, the method comprising:
initiating an unauthenticated wireless communication session between the mobile device and a field device;
receiving, with the field device, a primary key input provided by the mobile device via the unauthenticated session;
determining, with the field device, whether the primary key input is a correct primary key;
selectively causing a secondary key to be transmitted based on whether the primary key is the correct primary key;
receiving, by the field device, user input; and
selectively initiating an authenticated wireless session between the mobile device and the field device based whether the user input matches the secondary key.

18. The method of claim 17, wherein the secondary key is generated by the field device.

19. The method of claim 18, wherein the secondary key is generated after the field device determines that the primary key input is the correct primary key.

20. The method of claim 17, wherein the secondary key is transmitted by the field device using a process communication network.

21. The method of claim 17, wherein the primary key input includes identification information provided by the mobile device.

* * * * *